Figure 1:
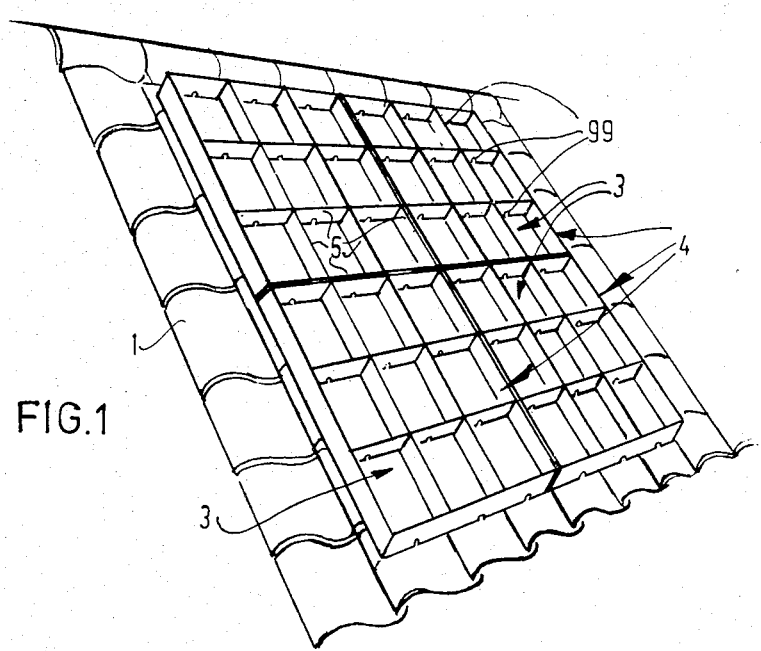

United States Patent [19]

Bertels

[11] Patent Number: 4,527,545
[45] Date of Patent: Jul. 9, 1985

[54] SOLAR ENERGY SYSTEM AND SOLAR HEAT COLLECTOR

[75] Inventor: Augustinus W. M. Bertels, Arnhem, Netherlands

[73] Assignee: Nagron Steel and Aluminium B.V., Rheden, Netherlands

[21] Appl. No.: 507,333

[22] Filed: Jun. 24, 1983

[30] Foreign Application Priority Data

Jul. 6, 1982 [NL] Netherlands .................. 8202713
Jul. 6, 1982 [NL] Netherlands .................. 8202714

[51] Int. Cl.³ .................................. F24J 3/02
[52] U.S. Cl. .................................. 126/433; 126/435; 126/441; 126/450; 165/104.21
[58] Field of Search ............ 126/433, 434, 436, 450, 126/441, 430, 435; 165/104.21

[56] References Cited

U.S. PATENT DOCUMENTS

| 3,996,919 | 12/1976 | Hepp | 126/436 |
| 4,050,508 | 9/1977 | Buckley | 126/434 X |
| 4,094,717 | 6/1978 | Barr | 126/441 X |
| 4,237,866 | 12/1980 | Rush | 126/433 |
| 4,258,701 | 3/1981 | Buckley | 126/434 |
| 4,346,693 | 8/1982 | Wagner et al. | 126/449 X |
| 4,353,357 | 10/1982 | Nelson | 126/441 |
| 4,375,216 | 9/1980 | Gessford | 126/441 X |

Primary Examiner—Larry Jones
Attorney, Agent, or Firm—Diller, Ramik & Wight

[57] ABSTRACT

The invention relates to a solar energy system comprising a collector consisting of a sloping space exposed to solar light for a heat transporting medium performing a primary circulation, which is thermally coupled by the downward run with a working medium circuit.

An object of the invention is to design a solar energy system in a manner such that in contrast to the conventional system no control or safety apparatus is required, since solely natural, physical mechanisms are used so that a self-controlling operation is obtained, as a result of which the risk of disturbances and standstill is considerably reduced and the intrinsic safety is enhanced.

The above-mentioned purposes are, in general, achieved by means of a system set forth in the preamble, the primary circulation of which takes place in a vessel partly filled with fluid and partly with the vapor thereof and operating as a heat pipe.

The invention further provides a solar heat collector, the active surface of which is divided into cells bounded by upright ribs. Owing to the provision of such cells the dissipation of heat by convection due to wind brushing past can be reduced to negligible proportions.

19 Claims, 15 Drawing Figures

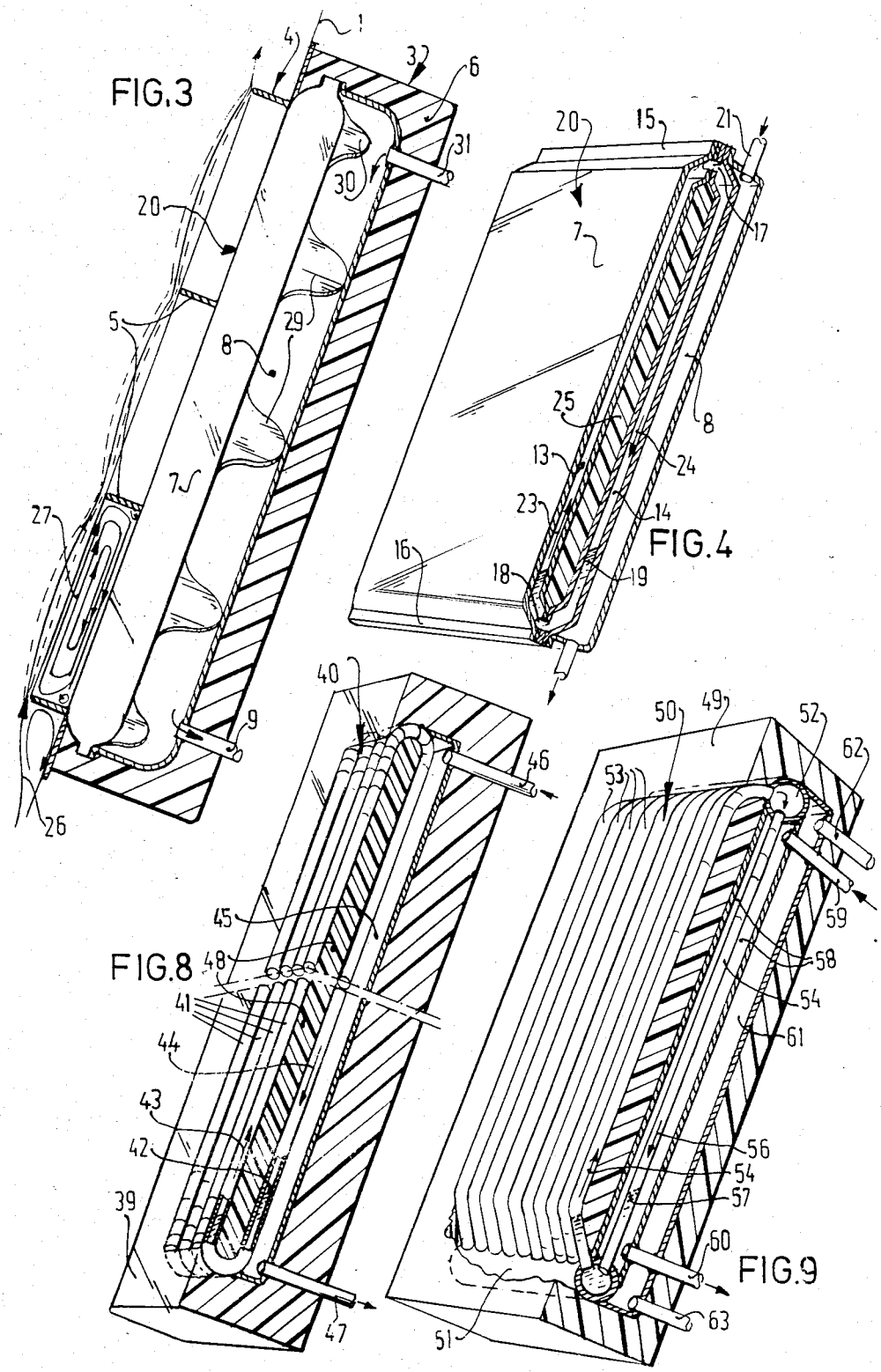

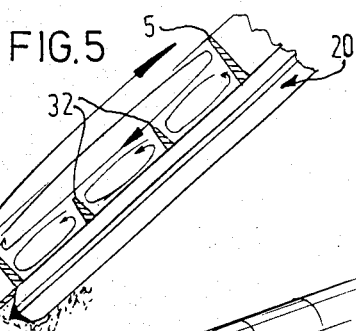
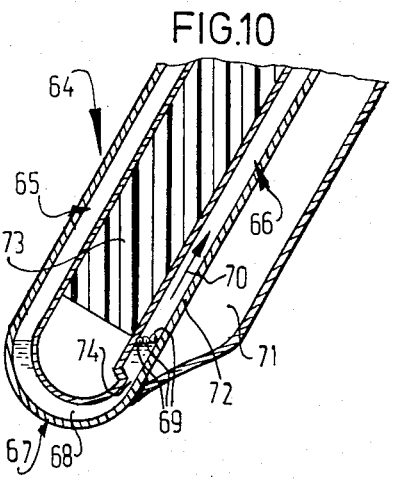
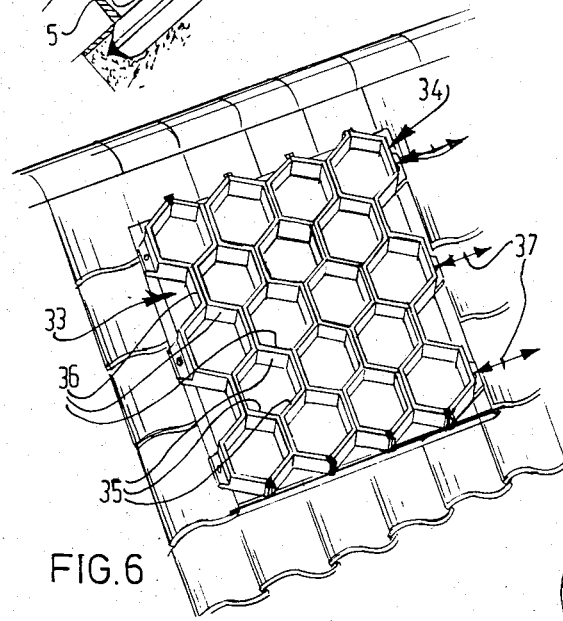
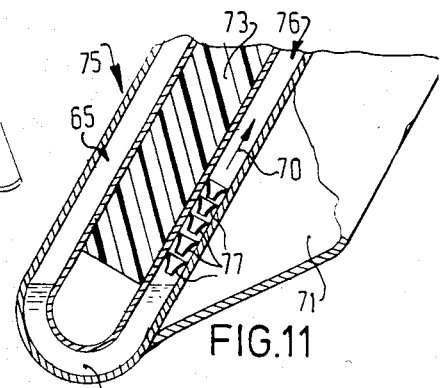
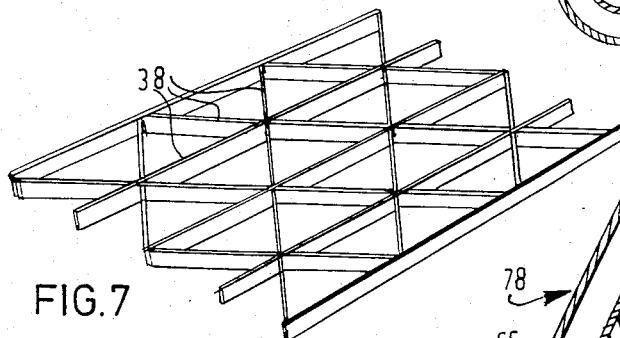
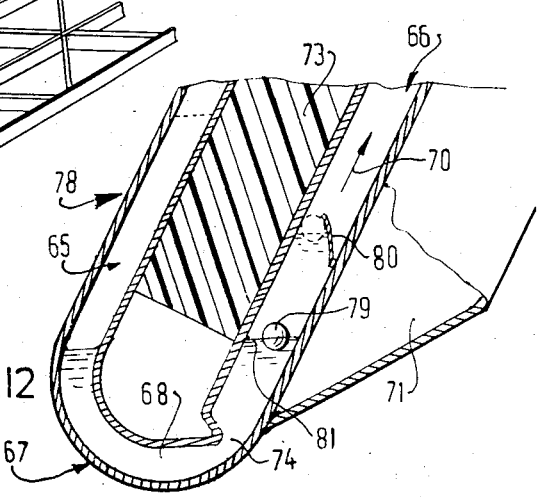

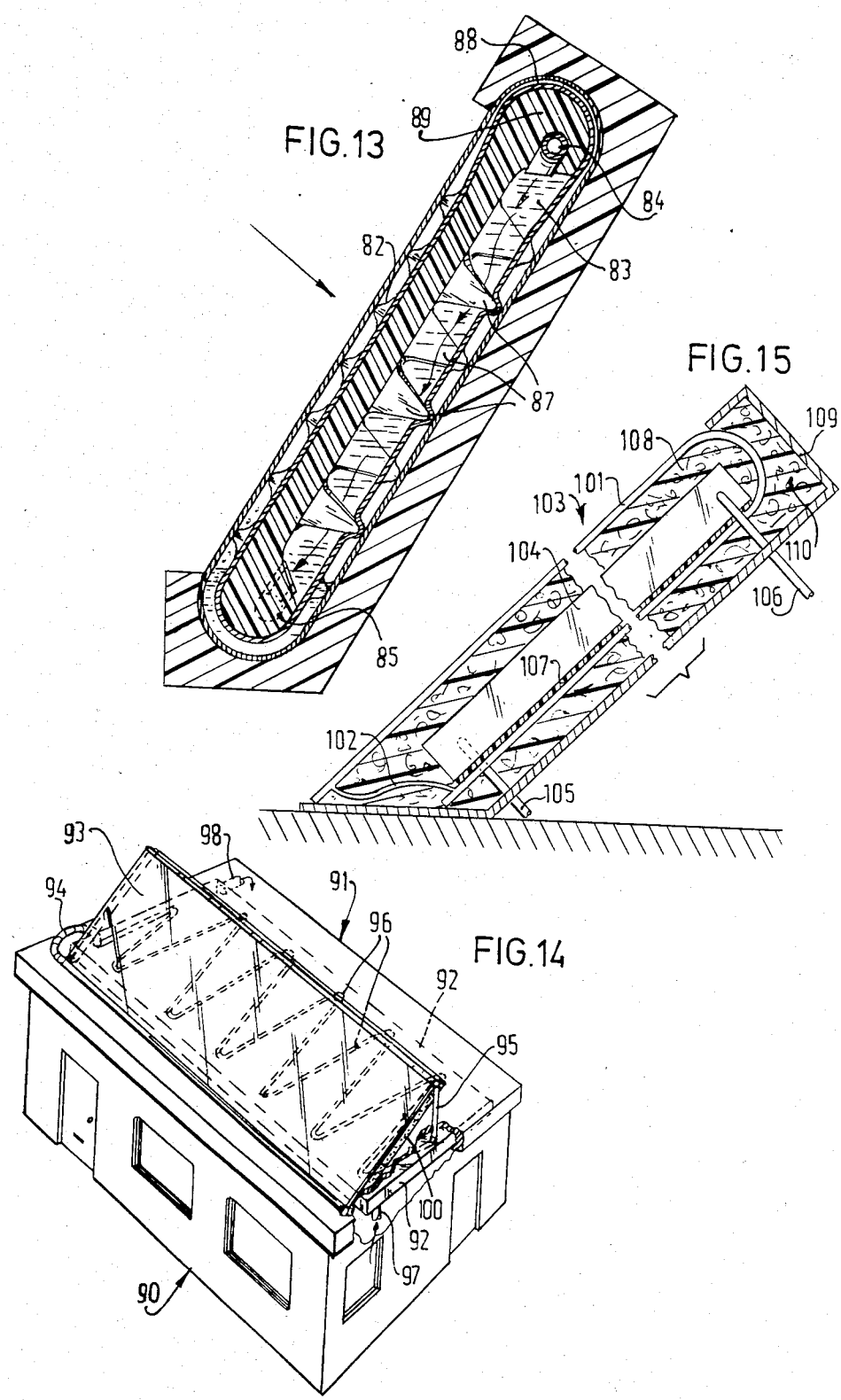

SOLAR ENERGY SYSTEM AND SOLAR HEAT COLLECTOR

The invention relates to a solar energy system comprising a collector consisting of a sloping space exposed to solar light for a heat transporting medium performing a primary circulation, which is thermally coupled by the downward run with a working medium circuit.

Such a system is known.

The invention has for its object to improve the degree of efficiency of the heat transfer between the primary circulation and the working medium circuit.

The invention has furthermore for its object to design a solar energy system in a manner such that it can be manufactured in a simple, cheap, and reliable manner so as to be particularly durable. A further object of the invention is to provide a solar energy system of very small size.

A further object of the invention is to design a solar energy system in a manner such that in contrast to the conventional system no control or safety apparatus is required, since solely natural, physical mechanisms are used so that a self-controlling operation is obtained, as a result of which the risk of disturbances and standstill is considerably reduced and the intrinsic safety is enhanced.

The above-mentioned purposes are, in general, achieved by means of a system set forth in the preamble, the primary circulation of which takes place in a vessel partly filled with fluid and partly with the vapour thereof and operating as a heat pipe.

Usually the working medium circuit comprises a heat store. According to the invention this heat storing vessel can be thermally coupled with that wall of the vessel operating as a heat pipe adjacent the part of the primary circulation which is downwrdly directed during insolation, that is to say during reception of the solar rays.

To give an idea reference is made here to the known flat structure of a collector. The capacity of the heat storing vessel varies with the corresponding collector surface. By directly coupling thermally the heat storing vessel with the downwardly directed part of the primary circulation bounded by the wall of the vessel operating as a heat pipe, the desired volume per surface unit is obtained by a minor additional thickness of the order of a few centimeters. Essential in this respect is that the heat absorption by the collector should take place at a high degree of efficiency as is the case in accordance with the basic idea of the invention, whilst heat loss due to the known "diode effect" of the heat pipe is substantially fully avoided. Therefore, the invention provides the possibility of making a very compact and, in particular, flat construction of the overall unit formed by the solar heat collector and the heat storing vessel so that the unit is suited for mounting on the roof of dwelling without excessively affecting the outlines of the dwelling.

In a preferred embodiment the heat storing vessel comprises two or more compartments materially separated, but intercoupled for heat transfer and included each in its own working medium circuit, at least one compartment being directly coupled with the wall of the vessel operating as a heat pipe bounding the downwardly directed part of the primary circulation. By way of example a stratified structure may be conceived which comprises a solar heat collector, a flat heat storing vessel directly coupled with the former and a second heat storing vessel arranged on the other side thereof, which, therefore, operates considerably more slowly than the first storing vessel.

Appreciable advantages are provided by the embodiment in which the flow occurring in the heat storing vessel during drainage of heat is directed downwards, since in this way stratification, that is to say, a natural, stratified temperature distribution can occur which has an enhancing effect on efficiency. In the same respect it is preferred for the heat transporting medium to produce a turbulent flow in the downwardly directed primary circulation. A still further increase in efficiency can be obtained when the wall of the vessel operating as a heat pipe bounding the downwardly directed part of the primary circulation is provided with a plurality of ribs, which preferably extend in the medium contained in the heat storing vessel and are heat-conductively connected with said wall.

The vessel operating as a heat pipe may have a loop-like structure and comprises two substantially parallel, at least partly flow passing plates, the corresponding ends of which are connected with one another so as to allow the stream to pass. In order to avoid heat losses during insolation-less intervals or periods of standstill, that is to say, periods in which no or substantially no solar heat is captured, the corresponding ends are preferably interconnected by one or more parts of relatively large heat resistance, whilst in addition the heat storing vessel may be arranged inside the vessel operating as a heat pipe so that a satisfactory insulation during insolation-less periods is ensured.

In order to minimize heat dispsensing in the reverse direction during insolation-less periods the solar energy system embodying the invention can be provided with means for suppressing a flow directed upwardly during insolation-less periods at the part of the primary circulation downwardly directed during insolation. For example, the part of the primary circulation downwardly directed during insolation may comprise at least one body that can float in the fluid and that covers the fluid surface to a substantial degree. Moreover, ribs extending in the streaming direction of the heat transfer medium during insolation may be present in the or each permeable part of the lower plate.

The invention further relates to a solar heat collector. Solar heat collectors are known in various designs. In general the collector comprises a thermally conductive plate to be exposed to solar radiation, which is coupled with or provided with channels passed through by a heat transfer medium. In order to prevent a heated collector from giving off convection heat to the surroundings, it is common practice to use a glass screen forming the cover of a completely closed housing inside which the solar heat collector is arranged in an insulated manner. The glass screen has the important disadvantage of being expensive and vulnerable, whilst its permeability is less than 100% and the glass has some reflective power, and moreover, due to unavoidable dirt the passage of solar radiation is adversely affected to a high extent.

The invention has in this connection for its object to design a solar heat collector in a manner such that is does not exhibit the above-mentioned disadvantage of the known solar heat collector.

In connection with the foregoing the invention provides a solar heat collector, the active surface of which is divided into cells bounded by upright ribs. Owing to the provision of such cells the dissipation of heat by convection due to wind brushing past can be reduced to negligible proportions. Since a transparent screen is omitted, soiling of the collector embodying the invention has no longer any influence since soiling can only result in that the absorptive power for solar radiation, even without the use of a known spectrally selective layer is and remains very satisfying.

It has been found that the height of each rib should preferably be at least equal to one tenth of the root of the surface of the cells. It is noted here that in practice, dependent on the operational conditions, that is to say, conditions such as geographic latitude, expected wind direction and the like, a compromise has to be found between the resultant abatement and the shadow effect, that is to say, the partial screening of solar radiation by the rib of the active collector surface.

The ribs may all be at least substantially of the same length. For example, the cells may substantially have the form of regular polygons.

Very effective is that embodiment in which the ribs constitute the rods of a grating releasably arranged on the active collector surface. The invention, therefore, relates furthermore to a grating comprising a plurality of ribs bounding closed contours, apparently intended and designed to be releasably arranged on the active surface of a solar heat collector.

In order to minimize parasitic effects, for example, cooling in the absence of insolation or impact of radiation, the ribs are preferably thermally insulted with respect to the active collector surface. When the ribs are made from steel with a rubber lower rim, an excellent resistance to UV radiation and weather conditions is obtained.

When relatively low ribs are used, thresholds may be provided inside each cell for breaking any secondary air whirls.

Figure 2:
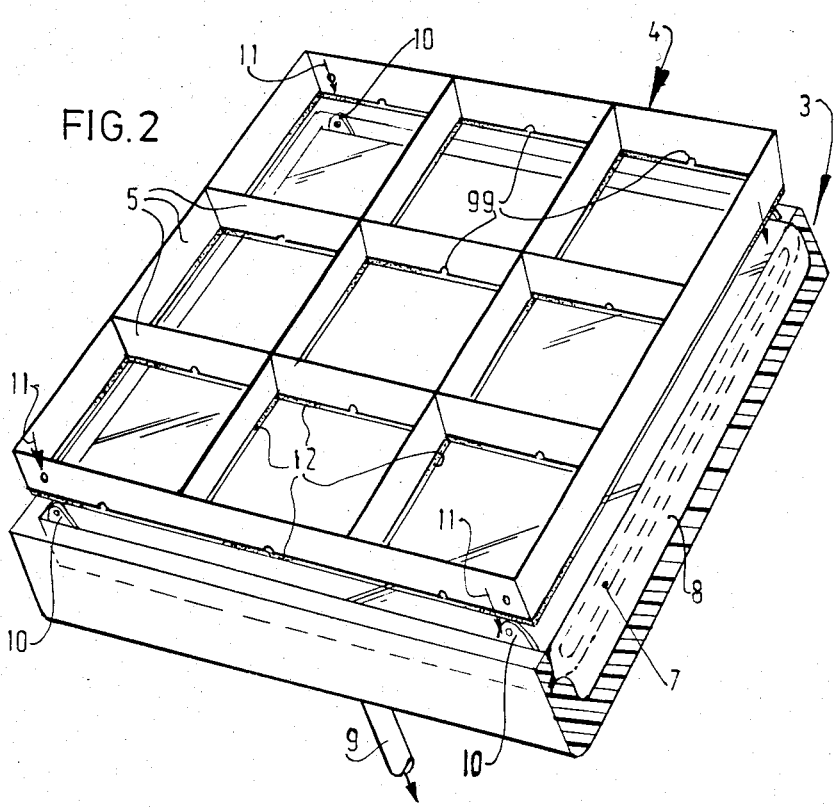

The invention will be set out with reference to a drawing showing a few embodiments. The drawing shows in:

FIG. 1 a partly prespective view of a roof with a solar heat collector field;

FIG. 2 partly in a perspective view and partly a cross-sectional view of a solar heat collector;

FIG. 3 a cross-sectional view of a solar heat collector embodying the invention;

FIG. 4 a partly perspective view and partly a sectional view of a solar heat collector;

FIG. 5 a detail of a variant;

FIG. 6 a perspective view of a solar heat collector with ribs in the form of a honeycomb;

FIG. 7 a grid of ribs in the form of isosceles triangles;

FIG. 8 a further embodiment of a solar heat collector embodying the invention;

FIG. 9 a solar heat collector embodying the invention having two heat storing vessels;

FIG. 10 a cross-sectional view of a number of collectors of a solar energy system in which a number of balls are floating in the fluid and largely covering the fluid level;

FIG. 11 a variant in which the lower plate has ribs blocking a counter-stream;

FIG. 12 a variant comprising a non-return-valve;

FIG. 13 a system comprising a heat storing vessel inside a loop-like vessel operating as a heat pipe;

FIG. 14 a system in which the vessel operating as a heat pipe is partly constructed in the form of a loop; and FIG. 15 the system in another embodiment.

FIG. 1 shows a tiled roof 1 with a collector field 2 having four solar heat collectors 3. On the outer face thereof are arranged four grids 4, each having 4×4 upright ribs 5.

FIG. 2 shows the structure of FIG. 1 in further detail. The solar heat collector 3 comprises a housing 6 filled with insulating material and accomodating a solar heat collector 7 in narrower sense together with a heat storing vessel 8 thermally coupled with the former and filled with a working medium, for example, tap water, that can pass through the vessel. A duct for the delivery of heated working medium is designated by reference numeral 9.

The top face of the solar heat collector 3 is provided with four fastening elements 10 serving to fix the grid 4 by means of screws as is schematically indicated by arrows 11. The lower face of the ribs 5 is provided with a satisfactorily heat-resistant, thermally insulating layer 12. For drainage small apertures 99 are provided.

Before dealing with FIG. 3, it is noted that the upright ribs 5 serve to considerably reduce the effective wind velocity at the active collector surface. This abating effect has the great advantage that any wind brushing past is considerably less capable of conducting heat away from the collector surface by convection. This results in an appreciable increase in efficiency.

The ribs 5, made of metal in this embodiment, are thermally separated from the active collector surface by a rubber layer 12. After the foregoing it will be obvious that a variant in which the ribs 5 themselves are made from thermally poorly conductive material provides the same advantageous effect. For reasons of durability, however, metal ribs are usually preferred.

FIG. 3 shows the solar heat collector 3 with the grid 4. For illustrating the activity of the upright ribs 5 the local wind direction is indicated by an arrow 26. The arrow 27 indicate schematically the pattern of air circulation in the spaces enclosed by the ribs 5. It is noted here that on the one hand the velocity of the circulating air along the active collector surface 20 is considerably reduced by a factor of the order of magnitude 10 with respect to the undisturbed wind velocity, whereas on the other hand the heat given off by the active collector surface is reduced by the buffer effect of the enclosed mass of circulating air and the diminution of the temperature gradient.

Inside the heat storing vessel 8 a plurality of heat conducting ribs 29, 30 improve the transfer of heat from the collector 7 to the medium in the heat storing vessel 8.

With the heat storing vessel 8 is connected not only a medium outlet duct 9, but also a medium feed duct 31.

FIG. 4 shows a solar heat collector 28 with the heat storing vessel 8. The collector 28 is constructed in the form of a vessel operating as a heat pipe and comprises two parallel, hollow plates i.e. an upper plate 13 and a lower plate 14, which communicate with one another at their top ends 15 and their lower ends 16 through holes 17, 18. Near the lower end the hollow space bounded by the plates 13, 14 has a fluid 19. Above the fluid 19 the space is filled with vapour of said fluid. Said hollow space can serve as a heat pipe by means of this fluid/vapour contents so that the solar light striking the active collector surface 20 can heat the medium in the heat storing vessel 8 with a very high degree of efficiency. For the supply of working medium to be heated a feed duct 21 is provided, whereas heated medium can be obtained through an outlet duct 22. Without describing the heat pipe known per se in further detail it is useful to note the streaming direction of the medium contained in the hollow space described above. Owing to the evaporation of the fluid 19 by the heat of the active collector surface 20 an upward stream is produced in the hollow upper plate as is indicated by an arrow 23. Inside the hollow lower plate the vapour moves downwards as is indicated by the arrow 24. By the heat dissipation to the downwardly directed part of this primary circulation the downwardly streaming vapourous or gaseous medium cools to an extent such that it can finally condense to replenish the fluid 19.

In order to avoid thermal contact between the upper plate 13 and the lower plate 14 a layer 25 of heat insulating material is arranged between them.

FIG. 5 shows a variant in which thresholds 32 are arranged between the ribs 5 so that even a further reduction of the effective air velocity at the active collector surface 20 is obtained. Arrows indicate schematically the stream patterns.

FIG. 6 shows a collector 33 with a grid 34 of ribs 35 in honeycomb arrangement. The figure clearly shows that the configuration in this embodiment comprises eight strips 36, the contact surfaces of which are interconnected in the manner shown. By using slightly resilient corner lines so that they can slightly turn, for example by providing a weakening line, the dimensions of the grid 34 can be adapted to the dimensions of the collector 33 by zigzag deformation in the direction of the arrows 37.

FIG. 7 shows the arrangement of ribs 38 bounding isosceles triangles.

In the embodiment of FIGS. 1, 2 and 3 it applies that the height of the ribs should be at least equal to one tenth of their length. In the variants of FIGS. 6 and 7 it applies that the height of the ribs should preferably be at least equal to one tenth of the root of the surface of the cells. In this way an excellent compromise is obtained in practice between the air velocity reducing effect of the ribs and an undesirably shadow effect.

FIG. 8 shows a configuration in which a solar heat collector 40 arranged in a housing 39 is formed by a plurality of heat pipes 41 arranged side by side and partly filled with liquid heat transfer medium 42. The arrows 43, 44 indicate, respectively, the upwardly directed part of the primary circulation and the downwardly directed part thereof in accordance with the arrows 23, 24 in FIG. 4.

Adjacent the downwardly directed part of the circulation is arranged a heat storing vessel 45 having an inlet duct 46 and an outlet duct 47 for the working medium. A layer of heat insulating material 48 is provided between the downwardly directed part and the upwardly directed part of the various circulations. In this connection reference is made to the description of the layer 25 in FIG. 4. The mode of operation of this embodiment of FIG. 8 need not be described further, since in principle it does not differ from that of the collector of FIG. 4.

The latter remark also applies to the variant of FIG. 9. A synthetic resin housing 49 accommodates a heat collector 50. This collector comprises a lower collecting pipe 51 and an upper collecting pipe 52, between which a plurality of upper pipes 53 and a plurality of lower pipes 54 are arranged. In contrast to the variant of FIG. 8 the medium circulations are not separated herein; they form part of a single primary circulation. The arrows 55, 56 indicate, respectively, the upwradly directed part and the downwardly directed part of the primary circulation. The condensed heat transporting medium is designated by reference numeral 57. Below the downwardly directed part of the primary circulation is arranged a first heat storing vessel 58 having a medium supply duct 59 and a medium outlet duct 60. Between this first storing vessel 58 a second heat storing vessel 61 separated from, but thermally coupled with the former is arranged and provided with a supply duct 62 and an outlet duct 63 for the working medium.

FIG. 10 shows the lower part of a solar heat collector 64 with an upper plate 65 and a lower plate 66. Fluid 68 is present in the U-shaped connection 67 and the adjacent lower zones of the upper plate 65 and the lower plate 66. Balls 69 are floating in the fluid in the lower plate and prevent evaporation of the fluid 68 in the direction of the arrow 70, that is to say, in the direction opposite the flow direction occuring in normal operation.

The normal operation of the collector 64 is not hindered by the balls 69. Owing to heat transfer from the lower plate to the heat storing vessel 71 condensation locally occurs so that the fluid flows down along the lower wall as is indicated by reference numeral 72. An insulating layer 73 is arranged between the plates 65 and 77.

At the lower end of the lower plate 66 a part 74 is narrowed so that the balls cannot pass through in order to prevent the balls from getting into the connecting part 67 in the event of complete evaporation of the fluid 68 and from floating in the fluid in the upper plate 65 subsequent to condensation, which would adversely affect the operation of the collector.

FIG. 11 shows a collector 75 having a lower plate 76 provided with a plurality of ribs 77 extending in the direction of flow of the heat transfer medium during insolation. These ribs serve to prevent a flow in the opposite sense as is indicated by the arrow 70.

FIG. 12 shows a detail of a collector 78 with a ball 70 floating in the fluid 68 and adapted to cooperate as a valve body with a valve seat 80. The valve 79, 80 is closed at a rise of the fluid level 81 in the event of reduced or even lacking insolation. In this way transport in the direction 70 and the attendant loss of heat are avoided.

FIG. 13 shows a variant of the collector shown in FIG. 3. The grid 4 is not shown in FIG. 13. A loop-shaped vessel 82 operating as a heat pipe accommodates a heat storing vessel 83 having a lateral inlet 84 and a lateral outlet for the working medium.

The interior of the vessel 83 is provided with a plurality of heat conducting ribs 87 arranged in rows in relatively off-set manner for optimum heat transfer.

The top side of the vessel 82 has a narrowed part 88 having a relatively high heat resistance.

The space between the vessel 82 and the vessel 83 is filled out with insulating material 89.

FIG. 14 shows a housing 90 with a flat roof 91 including a thin flat heat storing vessel 92. On the roof 91 a solar heat collector 93 is arranged in an inclined position such that it can capture maximum solar radiation. The collector 93 is designed in the form of a hollow plate and connected through ducts 4, 95 with a heat exchange pipe 96 provided in the vessel 92. Together with the ducts 94, 95 and the pipe 96 the collector 93 operates as a heat pipe. The vessel 92 has an inlet 97 and an outlet 98 for the working medium. The rear face of the collector is coated with a layer of insulating material 100.

FIG. 15 shows an embodiment comprising a generally U-shaped flat heat pipe 101, the ends of which are interconnected by a conduit 102. This system 103 further comprises a heat accumulator formed as a vessel 104 having an inlet 105 and an outlet 106 for working medium. The vessel 104 is thermally connected with the lower part of the heat pipe 101 through a thermally conductive paste 107. The remaining space within the heat pipe 101 is filled with insulation material 108.

The heat pipe 101 is housed in a housing 109 filled with insulation material 110.

The thickness of the heat pipe 101 may be about 5 mm; the thickness of the vessel 104 about 35 mm, the thickness of the housing 109 100 mm, the length of the housing 1300 mm; the width of the housing 109 1000 mm. This construction clearly is a very shallow one, yet ensures high efficiency.

It will be obvious that the invention is not limited to the embodiments described. Many other equivalent configurations and combinations not specified of particular features of the invention may be preferred with regard to specific requirements.

I claim:

1. In a solar energy system, a dished housing formed of insulating material and defining a generally rectangular recess adapted to be disposed in a generally upright position and a solar panel filling said recess, said panel including closed loop recirculating means for vaporizing and then condensing a working liquid in recirculating, closed loop fashion, said recirculating means comprising a vaporizing leg lying at the opening of said recess and presenting a surface area thereat which is adapted to be impinged upon by solar energy, said vaporizing leg extending generally vertically so that vapor rises therein, said recirculating means also including a condensing leg lying within said recess in spaced relation to said vaporizing leg and extending generally vertically so that condensate flows downwardly therein ultimately to return to said vaporizing leg, insulating means lying behind and in contact with said vaporizing leg so as to concentrate heat input into said vaporizing leg, a heat collecting chamber in heat exchange contact with said condensing leg, and means for circulating liquid through said collecting chamber so as to condense vapor within said condensing leg and thereby maintain the recirculation of the working liquid in said closed loop recirculating means.

2. In a solar energy system as defined in claim 1 wherein said housing provides a mounting surface in circumscribing relation to said recess, and an open gridwork secured in sealing contact with said mounting surface, said gridwork comprising upstanding ribs subdividing said surface area of said vaporizing leg into a series of substantially equal regions.

3. In a solar energy system as defined in claim 2 wherein the height of each rib is about equal to one-tenth of its length.

4. In a solar energy system as defined in claim 3 wherein the height of each rib is about one-tenth of the square root of said surface area of the vaporizing leg.

5. In a solar energy system as defined in claim 1 wherein said condensing leg defines a wall portion of said heat collecting chamber.

6. In a solar energy system as defined in claim 5 wherein said condensing leg is provided with heat transfer ribs projecting into and generally bottomed within said heat collecting chamber.

7. In a solar energy system as defined in claim 5 wherein said heat collecting chamber is disposed between said condensing leg and said insulating means.

8. In a solar energy system as defined in claim 5 wherein said heat collecting chamber is bottomed within said recess.

9. In a solar energy system as defined in claim 5 wherein said insulating means fills the space between said vaporizing leg and said condensing leg.

10. In a solar energy system as defined in claim 1 including means located in said condensing leg adjacent its juncture with said vaporizing leg for maintaining unidirectional circulation of vapor in said closed loop.

11. A solar panel for solar energy systems, comprising a generally rectangular housing formed of heat insulating material and defining a recess in one face thereof, solar heat exchange structure seated within said recess and a protective grid structure secured to said housing and serving to sandwich and maintain said heat exchange structure in bottomed position within said housing while reducing heat loss due to ambient wind conditions, said structure comprising closed loop recirculating means for abstracting solar energy and including a vaporizing leg defining a solar energy heat absorbing surface area at the opening of said recess and upon which said grid structure bears to sandwich and maintain the structure in bottomed position within said housing.

12. A solar panel as defined in claim 11 wherein said heat exchange structure is a unitary layered structure, said vaporizing leg defining the outer layer, the second layer comprising a slab of heat insulating material in contact with the inner side of said vaporizing leg, a further layer being a condensing leg connected in closed loop with said vaporizing leg, and a still further layer being in the form of a heat collecting chamber in heat exchange contact with said condensing leg.

13. A solar panel as defined in claim 12 wherein said slab is sandwiched between said vaporizing and condensing legs.

14. A solar panel as defined in claim 13 including a pan-like structure joined peripherally with said condensing leg to define said heat collecting chamber.

15. A solar panel as defined in claim 14 wherein said vaporizing leg is defined between a first pair of plates and said condensing leg is defined between a second pair of plates.

16. A solar panel as defined in claim 14 wherein said vaporizing leg is defined within a series of side-by-side tubes and said condensing leg is defined within a second series of side-by-side tubes.

17. A solar panel as defined in claim 11 wherein said grid structure comprises upstanding ribs subdividing said surface area into a series of substantially equal regions.

18. A solar panel as defined in claim 17 wherein the height of each rib is about one-tenth of the square root of said surface area of the vaporizing leg.

19. A solar panel as defined in claim 18 including means located in said condensing leg adjacent its juncture with said vaporizing leg for maintaining unidirectional circulation of vapor in said closed loop.

* * * * *